United States Patent [19]

Chapman

[11] Patent Number: 4,907,261
[45] Date of Patent: Mar. 6, 1990

[54] UNIVERSAL DC SIGNALLING DETECTOR

[75] Inventor: John T. Chapman, Sunyvale, Calif.

[73] Assignee: International Business Machines Corporation, Armonk, N.Y.

[21] Appl. No.: 317,221

[22] Filed: Feb. 28, 1989

[51] Int. Cl.⁴ .......................... H04M 7/02; H04M 7/12
[52] U.S. Cl. ...................................... 379/234; 379/236
[58] Field of Search ............... 379/229, 231, 234, 236, 379/237, 377, 382

[56] References Cited

U.S. PATENT DOCUMENTS 4,841,561  6/1989  Hill .................................. 379/355 X Primary Examiner—James L. Dwyer
Attorney, Agent, or Firm—Perman & Green

[57] ABSTRACT

A DC signalling Detector (DCSD) circuit 10 for processing DC signalling information from a telephony loop. In accordance with the invention the DC signals are processed to indicate, during a first time interval, a tip lead at ground potential, a tip lead at battery potential, and a tip lead disconnected from any potential. During a second interval of time DC signals are processed to indicate a forward loop current, a reverse loop current and the absence of loop current. These six conditions are resolved by the DCSD circuit into two output status lines. The two output status lines are amenable for being input to a controller 2, such as a local microprocessor. The DCSD circuit of the invention thus advantageously combines within one circuit the functionality of a tip voltage detector and a loop current detector.

13 Claims, 3 Drawing Sheets

FIG.2

| FWD/GND SIGNAL 10a | REV/BAT SIGNAL 10b | LOOP OPEN | LOOP CLOSED |
|---|---|---|---|
| 0 | 0 | Tip lead high impedance | No loop current |
| 0 | 1 | Tip lead at -48vDC | Reverse loop current |
| 1 | 0 | Tip lead at ground | Forward loop current |
| 1 | 1 | Transient condition | Transient condition |

UNIVERSAL DC SIGNALLING DETECTOR

FIELD OF THE INVENTION

This invention relates generally to telephony apparatus and, in particular, to an exchange-trunk circuit which interprets DC signalling information or a Direct Outward Dialing (DOD) trunk.

BACKGROUND OF THE INVENTION

A DOD telephony trunk is a typical means to connect a Private Automatic Branch Exchange (PABX) system to a Central Office (CO). At the PABX, a trunk card (TC) is typically employed to emulate the functionality of a telephone. A PABX controller uses the TC to transmit to and receive from the CO DC and AC signals.

One function of the TC is to monitor the telephone loop and extract DC signalling information therefrom. However, the nature of the DC signals varies from country to country and thus normally requires separate and complex dedicated TC circuitry to be provided for each country. Because of this, many conventional TC implementations are country-specific. As a result, additional cost and complexity is incurred in order to internationally distribute telephony equipment which includes a TC.

It is therefore one object of the invention to provide a single TC circuit which receives and processes a variety of country-specific DC telephone loop signals.

SUMMARY OF THE INVENTION

The foregoing problems are overcome and other advantages are realized by a DC Signalling Detector (DCSD) circuit for processing DC signalling information from a telephony loop. In accordance with the invention the DC signals are processed to indicate, during a first time interval, a tip lead at ground potential, a tip lead at battery potential, and a tip lead disconnected from any potential. During a second interval of time DC signals are processed to indicate a forward loop current, a reverse loop current and the absence of loop current. These six conditions are resolved by the DCSD circuit into two output status lines. The two output status lines are amenable for being input to a controller, such as a local microprocessor. The DCSD circuit of the invention thus advantageously combines within one circuit the functionality of a tip voltage detector and a loop current detector and provides for the detection of idle loop polarity.

In accordance with the invention there is provided a DC signalling detection circuit having inputs coupled to a telephony trunk loop including a Tip lead and a Ring lead. The circuit includes detection circuitry coupled to the inputs and has at least two outputs for indicating, during a first interval of time, the Tip lead at a ground potential, the Tip lead at a battery potential, or the Tip lead disconnected from any potential. The outputs further indicate, during a second interval of time, a presence of a forward loop current, a presence of a reverse loop current or an absence of loop current.

BRIEF DESCRIPTION OF THE DRAWING

The above set forth and other features of the invention will be made more apparent in the ensuing Detailed Description of the Invention when read in conjunction with the attached Drawing, wherein:

FIG. 1b shows in greater detail the DC Loop Holding Circuit of FIG. 1a;

FIG. 2 is a chart which illustrates the interpretation of the two status line outputs from the DCSD circuit.

DETAILED DESCRIPTION OF THE INVENTION

As will become apparent, the DCSD circuit of the invention takes full advantage of the fact that a tip voltage detector and a loop current detector are not required to operate at the same time. The tip voltage detector is used before a trunk loop is closed and the loop current detector is used thereafter. In that a local controller, such as a microprocessor which executes a control program, decides when the loop is to be open or closed, the controller also readily determines whether to interpret DCSD circuit output signals as a tip signal or as a loop current signal.

Figure 1A:
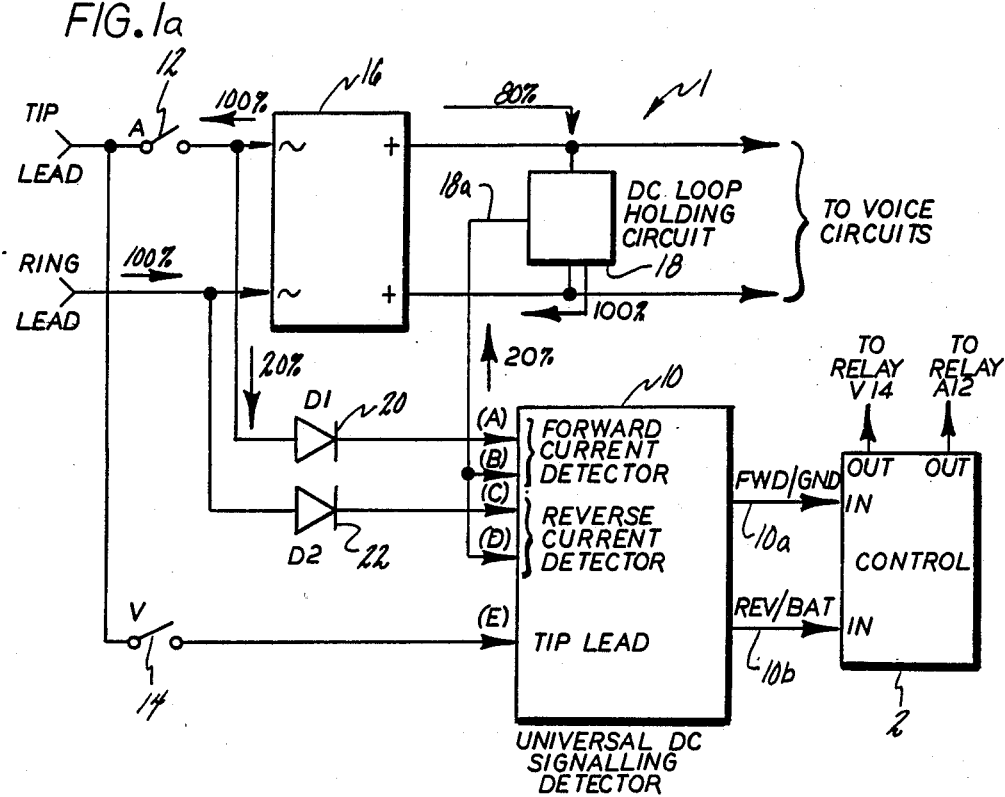
FIG. 1a shows a relationship of the DCSD circuitry of the invention to a telephone trunk.
Figure 1B:
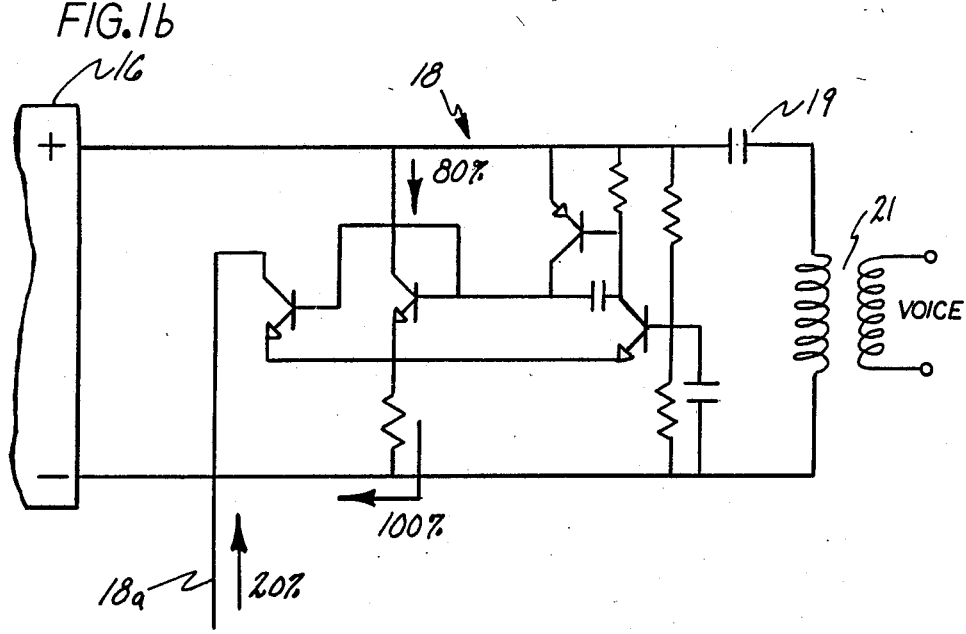

Referring now to FIG. 1a there is shown a relationship of a DCSD circuit 10 to a generic trunk interface such as a line card 1. An "A" relay 12 is employed for closing a trunk loop while a "V" relay 14 is employed for coupling a Tip lead to a tip voltage detector of the DCSD circuit 10. The A relay 12 and the V relay 14 are controlled by a local microprocessor device 2 or, alternatively, by a higher level controller (not shown) within the PABX. In normal operation either the A relay 12 is open and the V relay 14 is closed (an open loop condition) or the A relay 12 is closed and the V relay 14 is open (a closed loop condition). During a loop idle condition the A relay 12 and the V relay 14 are both open. Before placing an outgoing call the device 2 closes the V relay 14 in order to test the loop status. A diode bridge 16 has a bipolar DC input and a unipolar DC output. A DC Loop Holding Circuit 18 is coupled across the DC output of bridge 16 and has a terminal 18a which conveys a DC current having a magnitude of approximately 20% of the tip-ring loop current. The direction of current flow and percentages thereof are shown for a reverse current flow case. Circuit 18 may include a transformer device or, as shown in FIG. 1b, may include a solid state circuit for providing the DC current at terminal 18a. An AC voice signal riding on the DC output of bridge 16 is coupled by a capacitor 19 to voice circuitry, such as a transformer 21. Diodes D1 20 and D2 22 parallel diodes of the bridge 16.

D1 20 and D2 22 function as steering diodes in that each steers a portion of the current into different inputs of the DCSD 10, depending upon the direction of loop current. D1 20 passes approximately 20% of a forward loop current, if present, and D2 22 passes approximately 20% of a reverse loop current, if present. DCSD circuit 10 receives as inputs the current from 18a and the tip and ring loop current inputs, via D1 20 and D2 22. DCSD circuit 10 also receives a Tip lead signal via the V relay 14. In accordance with one aspect of the invention DCSD circuit 10 processes these inputs in a manner to be described to produce at least two status signal outputs. As shown in FIG. 2 these outputs are a FWD/GND signal 10a and a REV/BAT signal 10b. These signal outputs 10a and provided, or may be input to a higher level controller within the PABX.

FIG. 2 illustrates the interpretation of the two status lines 10a and 10b. The term "battery" as used herein indicates a source having an output of approximately −48 VDC while ground indicates approximately zero volts.

As can be seen, for an open loop condition (as defined above) the signals 10a and 10b define the condition of the Tip lead to be either a high impedance, at −48VDC, or at ground potential. For a closed loop condition signals 10a and 10b indicate the absence of loop current or, if loop current is present, the direction of flow of loop current. The transient condition refers to the (1,1) output state. For example, if the loop current is switched from forward to reverse, the state change of the circuit outputs 10a and 10b can reflect one of two cases as shown in the following table.

| INITIAL STATE | TRANSIENT STATE | FINAL STATE |
|---|---|---|
| 1,0 | 0,0 | 0,1 |
| 1,0 | 1,1 | 0,1 |

If the signals 10a and 10b remain in the 1,1 state for an extended period of time a detector failure is indicated.

Figure 3:
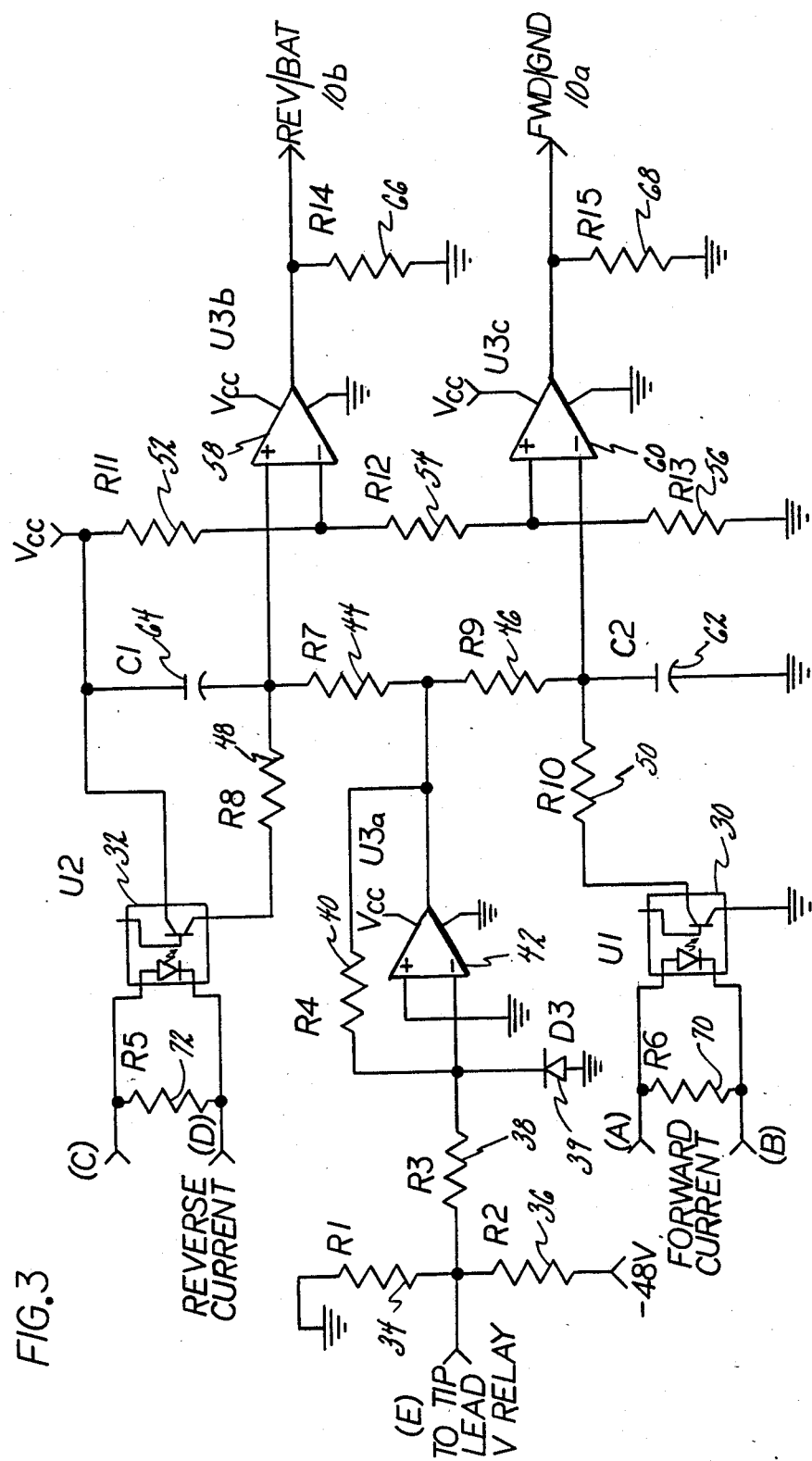
FIG. 3 is a detailed schematic diagram of the DCSD circuitry constructed in accordance with a presently preferred embodiment of the invention.

Referring to FIG. 3 the loop current is monitored with two loop current-to-voltage conversion devices, specifically optocouplers U1 30 and U2 32. U1 30 and U2 32 are connected in series with the loop, or with some element that carries the loop current. The inputs labeled A and B of U1 30 and the inputs C and D of U2 32 correspond to the inputs designated A, B, C and D shown in FIG. 1.

Describing first the tip voltage detection function of the DCSD circuit 10 it is assumed that a controller, such as the microprocessor 2, has opened the A relay 12 and that no current flowing through the LEDs of U1 30 and U2 32. It is also assumed that the controller has closed the V relay 14 to connect the Tip lead to the tip detector input E.

If a ground or a battery potential exists on the Tip than approximately 1250 ohms, or one-half of the subscriber loop impedance. The equivalent impedance of R1 34, R2 36 and R3 38 is selected to be significantly greater than 1250 ohms, such as 10,000 ohms. If the Tip lead is instead in a high impedance state, normally due to being disconnected by the CO, R1 34, R2 36 and R3 38 function as a voltage divider to bias the Tip lead to approximately −24 volts, or one half of the battery potential. If a ground or battery potential does exist on the Tip lead it will dominate the −24 volt bias potential provided by R1 34, R2 36 and R3 38.

R3 38 and R4 40, in conjunction with amplifier U3a 42, invert and step down the voltage from the Tip lead. The approximately zero volt to −48 volt range of the Tip lead is thereby converted to an approximately zero volt to +3 volt range. This voltage output of U3a 42 is input to a junction of R7 44 and R9 46. In this regard diode D3 39 prevents the junction of R3 38 and R4 40 from going below ground potential in the event that a large negative voltage occurs on the Tip lead.

In that the circuitry associated with U3a 42 operates on currents derived from the relatively large tip voltage U3a 42 does not itself directly experience the tip voltage Thus U3a 42 may be powered with a Vcc potential of approximately +5 volts, referenced to ground. In other words, U3a 42 does not require a common mode input range of zero to −50 volts.

Prior to the closure of the V relay 14 the junction of R1 34, R2 36 and R3 38 is approximately −4 volts, causing the output of U3a 42 to be approximately +1.5 volts. Since there is no loop current at this time, the effect of optocouplers U1 30 and U2 32, and thus R8 48 and R10 50, may be neglected. The voltage divider comprised of R11 52, R12 54 and R13 56 sets threshold voltages for two comparators U3b 58 and U3c 60. The threshold voltages are set such that with the output of U3a 42 at +1.5 volts, the output of U3b 58 and U3c 60 are each at a logic low level, or approximately zero volts.

A ground potential applied at the Tip lead causes the output of U3a 42 to drive towards ground potential. The time constant of R9 46 and capacitor C2 62 slows this transition to reduce transient noise spikes. The signal at the junction of R9 46 and C2 62 is coupled to the inverting input of comparator U3c 60. If the ground potential applied to the Tip lead is within a predetermined tolerance for a ground potential, the voltage threshold set by R13 56 is crossed causing the output of U3c 60 to assume a logic high level, or approximately 3.5 VDC. Simultaneously, the output of U3a 42 is applied to the non-inverting input of U3b 58 where the input is compared to the higher voltage threshold set by the combination of R12 54 and R13 56. The output of U3b 58 remains at a logic low level.

A battery potential applied at the Tip lead causes the output of U3a 42 to drive towards Vcc. The time constant of R7 44 and capacitor C1 64 slows this transition to reduce transient noise spikes. The signal at the junction of R7 44 and C1 64 is coupled to the non-inverting input of comparator U3b 58. If the battery potential applied to the Tip lead is within a predetermined tolerance for a battery potential, the voltage threshold appearing at R12 54 causes the output of U3b 58 to assume a logic high level, or approximately 3.5 VDC. Simultaneously, the output of U3a 42 is applied to the inverting input of U3c 60 where the input is compared to the lower voltage threshold set by R13 56. The output of U3c 60 remains at a logic low level.

It can be seen that U3a 42 functions as a voltmeter in that it couples the Tip lead voltage into the circuit 10. R11 52, R12 54 and R13 56 set the sensitivity and decision thresholds of the Tip lead voltage detector. R14 66 and R15 68 pull the low output signal of the comparators U3b to approximately ground potential such that the $V_{OL}$ of the comparator outputs is compatible with, for example, TTL logic levels.

The description provided above has been in relation to the operation of the DCSD circuit 10 as a tip voltage detector. The ensuing description describes the operation of the DCSD circuit 10 as a loop current detector.

Loop current is allowed to flow when the A relay 12 is closed and the V relay 14 is open. U1 30 is coupled to the loop in such a manner that a forward loop current is required to energize the internal LED and turn on the output transistor. U2 32 is coupled to the loop in such a manner that a reverse loop current is required to turn on the associated output transistor. The turn-on threshold of U1 30 and U2 32 are set by R6 70 and R5 72, respectively.

As has been stated, during loop current detection the V relay 14 is open. Thus, the output of U3a 42 remains at approximately 1.5 volts DC. In the absence of loop current both U1 30 and U2 32 are off and C1 64 and C2 62 are charged to approximately 1.5 volts DC, the output level of U3a 42. This results in the output of both U3b 58 and U3c 60 being low.

A forward loop current turns on U1 30, U1 30 discharging C2 62 through R10 50. As C2 62 discharges towards ground potential the comparator threshold set by R13 is crossed and the output of U3c 60 assumes a high logic level. The RC time constant of R10 50 and C2 62 is sufficiently long to provide immunity to loop current transients.

The operation of the reverse loop current detection circuitry is very similar to that of the forward loop detection circuitry described above. One exception is that the reverse loop detection circuitry is referenced to Vcc, or +5 VDC in this case, instead of being referenced to ground potential. Reverse current in the trunk loop turns on U2 32 which discharges C1 64 through R8 48. When the threshold of U3b 58, set by R11 52, is exceeded as C1 64 approaches Vcc the output of U3b 58 switches to a high logic level. Preferably U3b 58 and U3c 60 are a relatively low bandwidth operational amplifier having a relatively slow slew rate such that instabilities are avoided during switching.

In light of the foregoing disclosure it can be realized that the DCSD circuit 10 of the invention advantageously combines the operation of a tip voltage detector wit that of a with a loop current detector. The circuit 10 also includes but two output signals to indicate six logical states, three of which are a tip battery, tip ground and tip open states. Furthermore, it can be seen that the circuit 10 detects the presence of a ground potential or a battery potential on the Tip lead even in the presence of 5 VAC signal superimposed upon a 5 VDC offset. The circuit 10 of the invention also rejects the presence of a ground potential or a battery potential at the Tip lead if the potential is applied through a resistance of greater than 50,000 ohms, thereby rejecting leakage signals. The circuit 10 of the invention also provides an additional advantage that an input voltage range of 0 to −50 volts is measured by an amplifier which is powered only between +5 VDC and ground. In addition, due to the time constants provided by the circuit 10 interruptions of loop current of less than approximately 0.01 seconds are filtered and ignored.

While the invention has been particularly shown and described with respect to a preferred embodiment thereof, it will be understood by those skilled in the art that changes in form and details may be made therein without departing from the scope and spirit of the invention.

What is claimed is:

1. A DC signalling detection circuit having inputs coupled to a telephony trunk loop including a Tip lead and a Ring lead, the circuit comprising detection means coupled to the inputs and having at least two outputs for indicating, during a first interval of time, the Tip lead at a ground potential, the Tip lead at a battery potential, or the Tip lead disconnected from battery or ground potential; the at least two outputs further indicating, during a second interval of time, a presence of a forward loop current, a presence of a reverse loop current or an absence of loop current.

2. A DC signalling detection circuit as set forth in claim wherein the at least two outputs further indicate, during either the first interval of time or the second interval of time, an occurrence of a transient condition.

3. A DC signalling detection circuit as set forth in claim 1 wherein the detection means comprises an amplifier means having an input coupled to the Tip lead and an amplifier output signal coupled to means for comparing the amplifier output signal to at least two reference signals, the comparing means including means for driving the at least two outputs for indicating a result of a comparison between the amplifier output signal and the at least two reference signals.

4. A DC signalling detection circuit as set forth in claim wherein the detection means comprises a first loop current-to-voltage conversion means coupled to the Tip lead and a second loop current-to-voltage conversion means coupled to the Ring lead, each of the loop current-to-voltage conversion means having an output signal coupled to means for comparing each of the loop current-to-voltage means output signals to an associated reference signal, the comparing means including means for driving the at least two outputs for indicating a result of a comparison between the loop current-to-voltage conversion means output signals and the associated reference signals.

5. A DC signalling detection circuit as set forth in claim 4 wherein each of the loop current-to-voltage conversion means comprises an optical coupler means having a LED coupled in series with the loop current and a transistor means having a control terminal optically coupled to the LED and an output terminal coupled to a load.

6. A DC signalling detection circuit as set forth in claim 4 wherein each of the loop current-to-voltage conversion means output signals is coupled to an associated capacitance for filtering transient signals from the output signals.

7. DC signalling detection apparatus including a circuit having inputs coupled to a telephony trunk loop including a Tip lead and a Ring lead, the circuit comprising a loop current detection means and a Tip lead potential detection means coupled to the inputs and having at least two outputs for indicating, during a first interval of time, the Tip lead at a ground potential, the Tip lead at a battery potential, or the Tip lead disconnected from a potential; the at least two outputs further indicating, during a second interval of time, a presence of a forward loop current, a presence of a reverse loop current or an absence of loop current; the apparatus further including control means coupled to the at least two output signals and responsive thereto for detecting DC signalling information from the telephony trunk.

8. Apparatus as set forth in claim 7 and further comprising a first switch means serially coupled between the Tip lead and the Tip lead potential detection means, the apparatus further comprising a second switch means serially coupled between the Tip lead and the loop current detection means, the first switch means and the second switch means being coupled to the control means and controlled thereby such that during the first interval of time the first switch means is closed and the second switch means is open and that during the second interval of time the first switch means is open and the second switch means is closed.

9. Apparatus as set forth in claim 8 and further comprising rectifying means having inputs coupled to the Tip lead and to the Ring lead for rectifying an alternating current signal thereon to obtain at an output a direct current, the apparatus further including means, coupled to the rectifying means output signal, for coupling a portion of the direct current to the loop current detection means.

10. Apparatus as set forth in claim 9 wherein the loop current detection means comprises a first loop currentto-voltage conversion means coupled to the Tip lead and to the rectifying means output signal and a second loop current-to-voltage conversion means coupled to the Ring lead and to the rectifying means output signal, each of the loop current-to-voltage conversion means having an output signal coupled to means for comparing each of the loop current-to-voltage means output signals to an associated reference signal, the comparing means including means for driving the at least two outputs for indicating a result of a comparison between the loop current-to-voltage conversion means output signals and the associated reference signals.

11. Apparatus as set forth in claim 10 wherein the circuit further comprises amplifier means having an input coupled to the Tip lead through the first switch means and an amplifier output signal coupled to the comparing means for comparing the amplifier output signal to the at least two reference signals, the driving means driving the at least two outputs for indicating a result of a comparison between the amplifier output signal and the at least two reference signals.

12. Apparatus as set forth in claim 11 wherein the circuit further includes means for biasing the amplifier means input, the biasing means being operable for biasing the amplifier means input to a predetermined potential when the Tip lead is disconnected from a potential.

13. Apparatus as set forth in claim 12 wherein the predetermined potential is approximately one half of the battery potential.

* * * * *

UNITED STATES PATENT AND TRADEMARK OFFICE
CERTIFICATE OF CORRECTION

PATENT NO. : 4,907,261

DATED : March 6, 1990

INVENTOR(S) : John T. Chapman

It is certified that error appears in the above-identified patent and that said Letters Patent is hereby corrected as shown below:

IN THE CLAIMS:

Claim 2, Col. 5, line 63, after "claim" insert the numeral --1--.

Claim 4, Col. 6, line 8 after "claim" insert the numeral --1--.

Signed and Sealed this

Fifteenth Day of January, 1991

Attest:

HARRY F. MANBECK, JR.

*Attesting Officer*    *Commissioner of Patents and Trademarks*